United States Patent
Hirayama et al.

(10) Patent No.: US 11,593,151 B2
(45) Date of Patent: Feb. 28, 2023

(54) INFORMATION PROCESSING APPARATUS AND SEMICONDUCTOR DEVICE

(71) Applicant: FUJIFILM BUSINESS INNOVATION CORP., Tokyo (JP)

(72) Inventors: Yuya Hirayama, Kanagawa (JP); Tsutomu Nakaminato, Kanagawa (JP); Kenji Kuroishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 262 days.

(21) Appl. No.: 16/816,366

(22) Filed: Mar. 12, 2020

(65) Prior Publication Data

US 2021/0004260 A1    Jan. 7, 2021

(30) Foreign Application Priority Data

Jul. 4, 2019 (JP) .............. JP2019-124964

(51) Int. Cl.
*G06F 3/06* (2006.01)
*G06F 3/00* (2006.01)
(Continued)

(52) U.S. Cl.
CPC .......... *G06F 9/462* (2013.01); *G06F 9/30127* (2013.01); *G06F 9/4484* (2018.02); *G06F 3/0683* (2013.01); *G06F 3/12* (2013.01); *G06F 3/1215* (2013.01); *G06F 3/1234* (2013.01); *G06F 3/1263* (2013.01); *G06F 3/1296* (2013.01)

(58) Field of Classification Search
CPC .... G06F 9/462; G06F 9/4484; G06F 9/30127; G06F 3/1296; G06F 3/1285; G06F 3/1234; G06F 3/1215; G06F 11/2082; G06F 3/0683; G06F 3/12; G06F 3/1263
See application file for complete search history.

(56) References Cited

U.S. PATENT DOCUMENTS

2002/0105674 A1 * 8/2002 Nomura ............. H04N 1/00424
358/1.15
2009/0323111 A1 * 12/2009 Goda ................. G03G 15/5012
358/1.15
(Continued)

FOREIGN PATENT DOCUMENTS

JP          4756599 B2    8/2011
JP          2018-148455 A    9/2018

OTHER PUBLICATIONS

Jeremiah Deboever et al., Challenges in Reducing the Computational Time of QSTS Simulations for Distribution System Analysis, May 2017, [Retrieved on Oct. 25, 2022], Retrieved from the internet: <URL: https://www.osti.gov/servlets/purl/1367462> 36 Pages (1-36) (Year: 2017).*

*Primary Examiner* — Anibal Rivera
(74) *Attorney, Agent, or Firm* — Oliff PLC

(57) ABSTRACT

A semiconductor device includes three integrated circuits. One of the integrated circuits includes: a first connector configured to connect to a device; and a transmitter. The transmitter is configured to transmit to another integrated circuit, first data on each of a plurality of pieces of packet data. The transmitter is also configured to, when the first connector is connected to the device, while a second controller is performing a second process, transmit, to a first controller, a request to process data transmitted from the device.

10 Claims, 7 Drawing Sheets

(51) Int. Cl.
*G06F 9/46* (2006.01)
*G06F 9/30* (2018.01)
*G06F 9/448* (2018.01)
*G06F 3/12* (2006.01)

(56) References Cited

U.S. PATENT DOCUMENTS

2010/0274986 A1* 10/2010 Matsumoto ............. G06F 12/02
    711/E12.001
2016/0217048 A1* 7/2016 Nakao ................... G06F 3/0683

* cited by examiner

FIG. 5

| REQUEST | HEADER INFORMATION | HANDOVER |
|---|---|---|
| UI RENDERING | A, B, C | YES |
| | OTHER THAN A TO C | NO |
| DECOMPOSING | A, B, C | YES |
| | OTHER THAN A TO C | NO |
| OTHERS | | NO |
| NOP | | NO |

INFORMATION PROCESSING APPARATUS AND SEMICONDUCTOR DEVICE

CROSS-REFERENCE TO RELATED APPLICATIONS

This application is based on and claims priority under 35 USC 119 from Japanese Patent Application No. 2019-124964 filed Jul. 4, 2019.

BACKGROUND

(i) Technical Field

The present disclosure relates to an information processing apparatus and a semiconductor device.

(ii) Related Art

Information processing apparatuses may include a first integrated circuit, which has a first controller that processes data and that controls operations of devices, and a second integrated circuit which has a second controller whose data processing speed is faster than that of the first controller. The first controller and the second controller are used, for example, for different processes.

For example, when the second controller is instructed to perform a second process after starting a first process and before completing the first process, the second controller may suspend the first process, and may perform the second process with greater priority than the first process.

Techniques of the related art are disclosed in Japanese Unexamined Patent Application Publication No. 2018-148455 and Japanese Patent No. 4756599.

Assume the case in which the second controller performs the second process with greater priority than the first process after starting the first process and before completing the first process. In this case, if the first process is not restarted until completion of the second process regardless of data subjected to the first process, a waiting time may occur from the suspension of the first process till the restart of the first process.

SUMMARY

Aspects of non-limiting embodiments of the present disclosure relate to a technique for, in the case where the second controller performs a second process with greater priority than a first process after starting the first process and before completing the first process, reducing a waiting time from suspension of the first process compared with the case in which the first process is not restarted until completion of the second process.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first integrated circuit and a second integrated circuit. The first integrated circuit includes a first controller which processes data obtained from a device and which controls operations of the device. The second integrated circuit includes a second controller whose data processing speed is faster than a data processing speed of the first controller. When the second controller performs a second process with greater priority than a first process after start of the first process and before completion of the first process, the second controller determines whether or not the first controller is to restart the first process on the basis of a condition defined as to data subjected to the first process.

BRIEF DESCRIPTION OF THE DRAWINGS

Exemplary embodiment of the present disclosure will be described in detail based on the following figures, wherein:

FIG. 5 is a diagram illustrating an exemplary configuration of a handover management table;

DETAILED DESCRIPTION

Referring to the attached drawings, an exemplary embodiment of the present disclosure will be described in detail below.

Herein, a description will be made by taking an image forming apparatus as an example. The image forming apparatus described in the present exemplary embodiment forms images on sheets, and has the copy function, the scanner function, the fax reception/transmission function, and the print function.

However, the image forming apparatus does not necessarily have all of these functions. The image forming apparatus may be specialized in any one of the functions, for example, a copier, a scanner (including a three-dimensional scanner), a fax transceiver, or a printer (including a three-dimensional printer).

The Schematic Configuration of the Image Forming Apparatus

Figure 1:
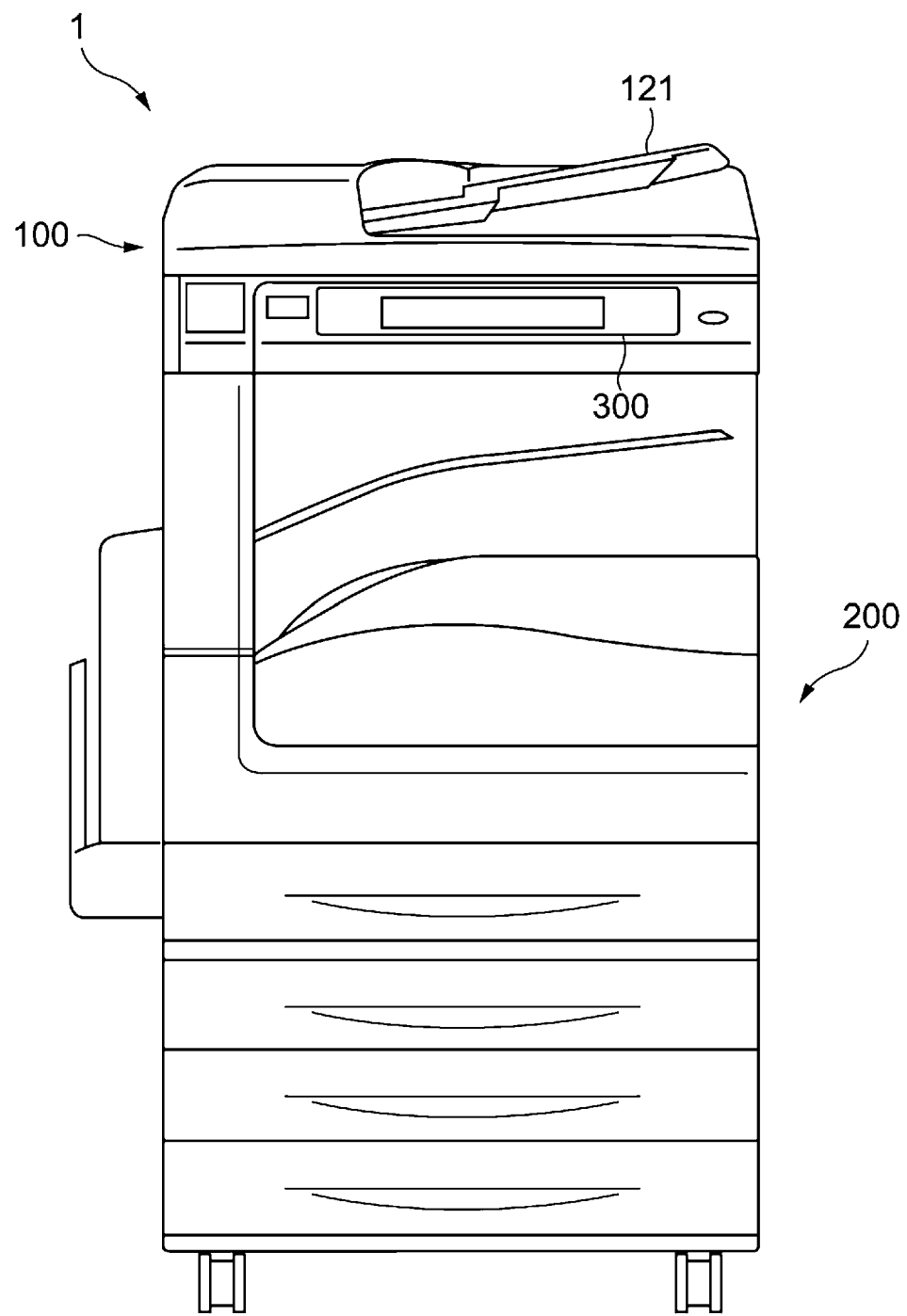
FIG. 1 is an external view of an image forming apparatus according to the present exemplary embodiment.

FIG. 1 is an external view of an image forming apparatus 1 according to the present exemplary embodiment.

Figure 2:
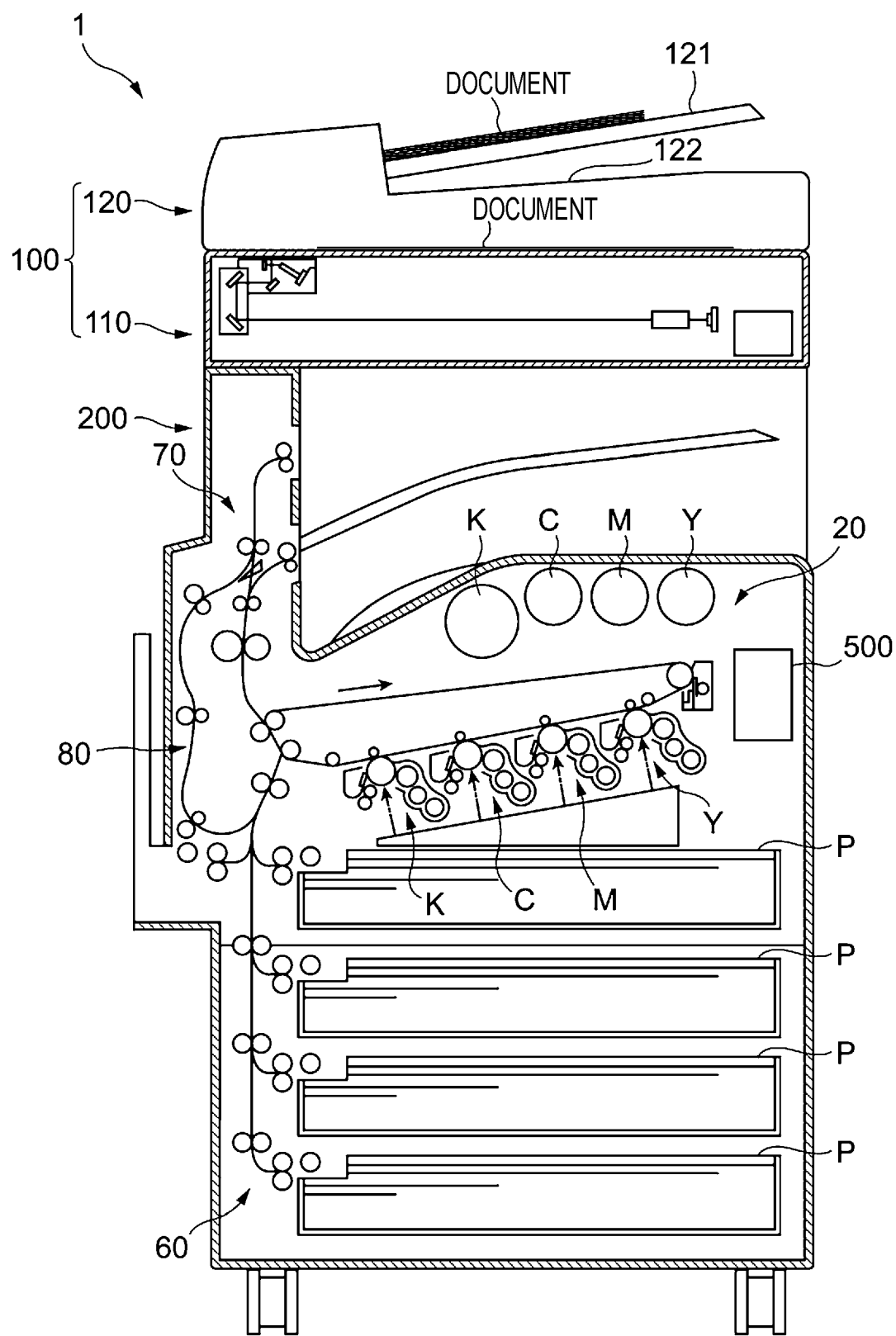
FIG. 2 is a diagram illustrating the internal structure of an image forming apparatus according to the present exemplary embodiment.

FIG. 2 is a diagram illustrating the internal structure of the image forming apparatus 1 according to the present exemplary embodiment.

The image forming apparatus 1 includes an image reading apparatus 100, which reads a document image, and an image recording apparatus 200 which records the image on a sheet.

The image forming apparatus 1 also includes a user interface (UI) 300 used to receive a user operation and present various types of information to a user.

The image forming apparatus 1 also includes a control device 500 which controls the operations of the entire image forming apparatus 1.

The image forming apparatus 1 is an exemplary information processing apparatus. The control device 500 is also an exemplary information processing apparatus.

The image reading apparatus 100 is attached on the image recording apparatus 200. The image reading apparatus 100 reads a document image optically.

The image recording apparatus 200 includes an engine used in image formation and a mechanism used in transport of a sheet, and includes the control device 500 disposed therein.

The user interface 300 is disposed on the front of the image reading apparatus 100 so that its operation surface faces a user who operates the image forming apparatus 1.

The image reading apparatus 100 includes an image reading unit 110 which reads a document image, and a document transport unit 120 which transports a document to the image reading unit 110. The document transport unit 120 is disposed in an upper portion of the image reading apparatus 100. The image reading unit 110 is disposed in a lower portion of the image reading apparatus 100.

The document transport unit 120 includes a document holding unit 121, which holds documents, and a document discharge unit 122, to which a document pulled from the document holding unit 121 is discharged. A transport mechanism (not illustrated) is used to transport the document from the document holding unit 121 to the document discharge unit 122.

The document transport unit 120 is also called an auto document feeder (ADF).

An optical reading system may be moved relatively with respect to a document so that the document image is read.

The image recording apparatus 200 includes an image forming unit 20, a sheet supply unit 60, a sheet discharge unit 70, and a reverse transport unit 80. The image forming unit 20 forms an image on a sheet P pulled from a sheet tray. The sheet supply unit 60 supplies a sheet P to the image forming unit 20. The sheet discharge unit 70 discharges a sheet P on which the image forming unit 20 has formed an image. The reverse transport unit 80 reverses a sheet P which has been output from the image forming unit 20, and transports the reversed sheet P again to the image forming unit 20.

These configurations are known, and a detailed description will not be made. The image forming unit 20 has recording units which are disposed therein along the transport path of a sheet P and which correspond the colors of black (K), cyan (C), magenta (M), and yellow (Y). The color types and a combination of colors are exemplary.

The user interface 300 includes a reception apparatus, which receives an instruction from a user, and an output apparatus which provides information to the user. Specifically, the user interface 300 includes an operation receiving unit and a display unit.

The operation receiving unit provides, for example, a function of detecting operations on hardware keys, and a function of detecting operations on software keys. The display unit displays, for example, a screen for providing information, and software keys.

The Connection Configuration Between Functional Modules

Figure 3:
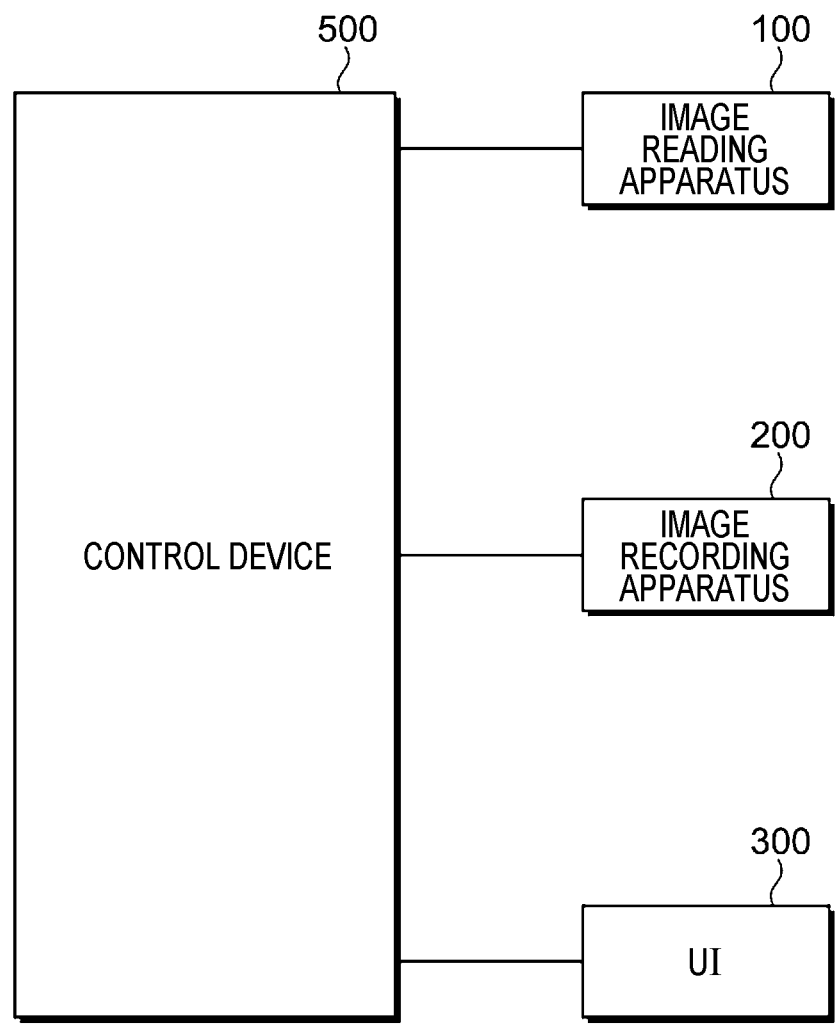
FIG. 3 is a diagram for describing an exemplary connection configuration between functional modules such as a control device included in an image forming apparatus.

FIG. 3 is a diagram for describing an exemplary connection configuration between functional modules such as the control device 500 included in the image forming apparatus 1.

The image reading apparatus 100, the image recording apparatus 200, and the user interface 300 are connected to the control device 500. Each of the image reading apparatus 100, the image recording apparatus 200, the user interface 300, and the control device 500 has embedded semiconductor chips which function as functional modules.

In the present exemplary embodiment, a semiconductor substrate, in which multiple Mochis (modular chips) are integrated, is used. A Mochi is a semiconductor chip in which only necessary functions are selectively integrated. Mochi is a trademark.

Methods for interconnection between Mochis include a parallel connection method and a serial connection method. The present exemplary embodiment employs the serial connection method. That is, in the present exemplary embodiment, data between Mochis is transferred by using the serial transmission method.

The Internal Configuration of the Control Device

Figure 4:
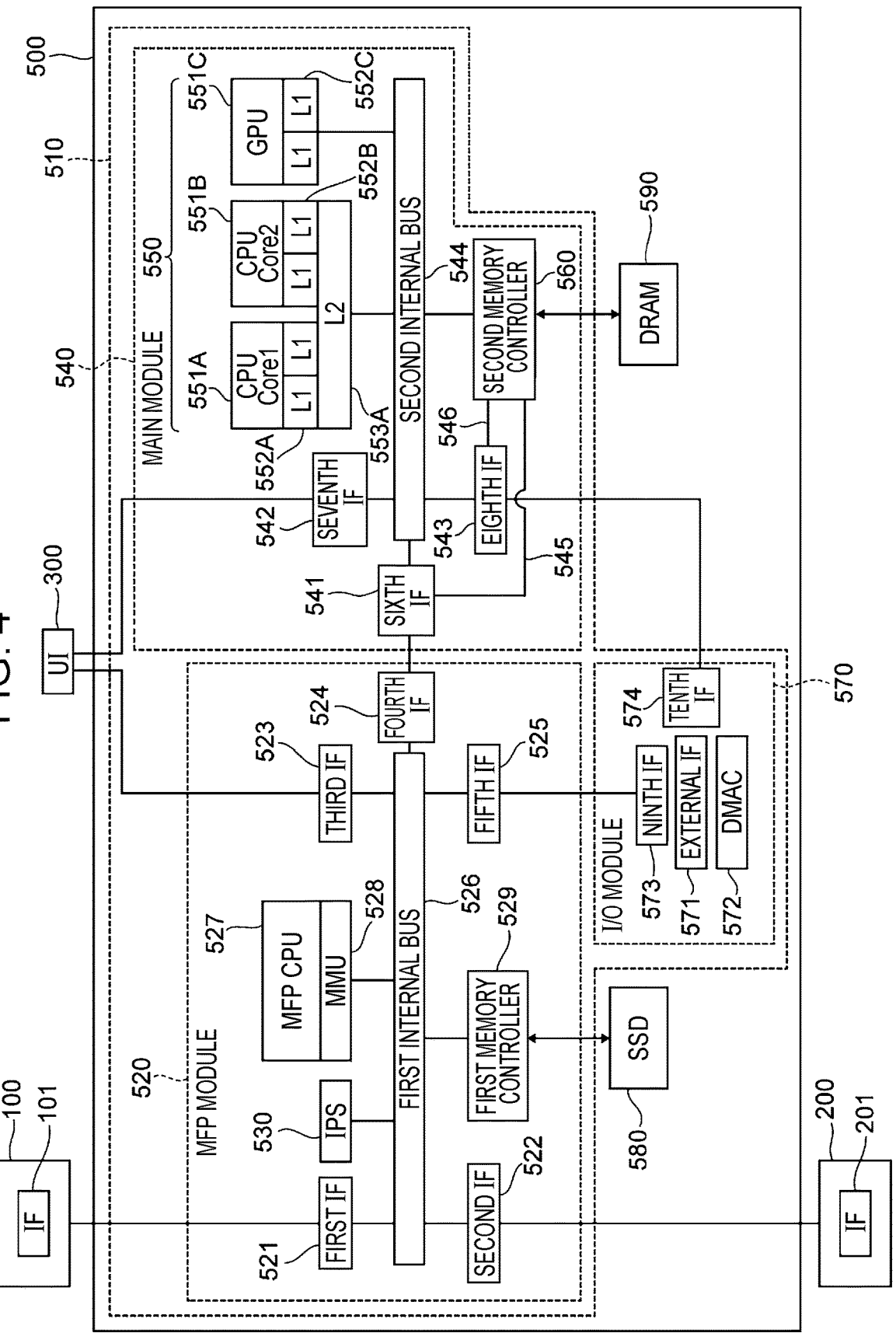
FIG. 4 is a diagram for describing an exemplary internal configuration of an image reading apparatus, an image recording apparatus, and a control device.

FIG. 4 is a diagram for describing an exemplary internal configuration of the image reading apparatus 100, the image recording apparatus 200, and the control device 500.

The image reading apparatus 100 includes a Mochi interface module 101. The Mochi interface module 101 transfers document image data to the control device 500.

The image recording apparatus 200 includes a Mochi interface module 201. The Mochi interface module 201 receives image data transferred from the control device 500.

The control device 500 is connected to the image reading apparatus 100, the image recording apparatus 200, and the user interface 300 through an external bus. The control device 500 according to the present exemplary embodiment includes a Mochi unit 510, in which multiple Mochis are integrated, a solid state drive (SSD) 580, and a dynamic random access memory (DRAM) 590. The Mochi unit 510 is interpreted as an exemplary semiconductor device.

The Mochi unit 510 includes a multifunction peripheral (MFP) module chip 520, which serves as an exemplary first integrated circuit, a main central processing unit (CPU) module chip 540, which serves as an exemplary second integrated circuit, and an input/output (I/O) module chip 570 which serves as an exemplary third integrated circuit.

The MFP module chip 520 has a function of controlling the operations of the image reading apparatus 100 and the image recording apparatus 200. The image reading apparatus 100, the image recording apparatus 200, the user interface 300, and the MFP module chip 520 are used to accomplish the functions of a copier, a scanner, a fax transceiver, a printer, and the like which are performed by the image forming apparatus 1. That is, if the control device 500 includes the MFP module chip 520, the functions of the image forming apparatus 1 may be accomplished even without the main CPU module chip 540.

The MFP module chip 520 includes an MFP CPU 527, a first Mochi interface module 521, a second Mochi interface module 522, a third Mochi interface module 523, a fourth Mochi interface module 524, and a fifth Mochi interface module 525. The MFP module chip 520 also includes a first internal bus 526, a memory management unit 528, a first memory controller 529, and an intrusion prevention system 530.

The MFP CPU 527, which serves as an exemplary first controller, controls the operations of the image forming apparatus 1. On reception of an instruction to read image data, the MFP CPU 527 reads image data transferred from the image reading apparatus 100, and stores the data in the SSD 580. On reception of an instruction to form an image, the MFP CPU 527 transfers image data to the image recording apparatus 200, and causes the image recording apparatus 200 to form an image on a sheet.

The MFP CPU 527 performs data processing. Examples of the data processing include a process of specifying the type of data. Examples of the process of specifying the type of data include a process of determining whether data is image data or data related to an instruction.

As the MFP CPU 527, for example, a CPU whose operating frequency is 0.66 MHz is used.

The first Mochi interface module 521 receives data transferred from the image reading apparatus 100.

The second Mochi interface module 522 transfers data to the image recording apparatus 200.

The third Mochi interface module 523 transfers data to the user interface 300. Data transferred from the third Mochi interface module 523 is displayed on the display unit of the user interface 300. While data transferred from the main CPU module chip 540 is displayed on the display unit of the user interface 300, data is not transferred from the third Mochi interface module 523 to the user interface 300.

The fourth Mochi interface module 524 receives/transmits data from/to the main CPU module chip 540.

The fifth Mochi interface module 525 receives data transferred from the I/O module chip 570.

The first internal bus 526 transfers packet data of predetermined size (for example, 64 bytes). The first internal bus 526 connects the first Mochi interface module 521, the second Mochi interface module 522, the third Mochi interface module 523, the fourth Mochi interface module 524, the fifth Mochi interface module 525, the memory management unit 528, the first memory controller 529, and the intrusion prevention system 530 to each other. The first internal bus 526 is used to transfer packet data.

In the present exemplary embodiment, data transfer in the Mochi unit 510 is performed on each piece of packet data.

The memory management unit 528 manages address information corresponding to data stored by the MFP CPU 527.

The first memory controller 529 is a circuit for controlling, for example, storage of data in the SSD 580, retrieval of data from the SSD 580, and refresh of the SSD 580. The first memory controller 529, which is connected to the first internal bus 526, receives/transmits packet data from/to the other devices connected to the first internal bus 526.

The intrusion prevention system 530 monitors data passing through the first internal bus 526 so as to prevent malicious access to the MFP module chip 520.

The main CPU module chip 540 includes a main CPU 550, a sixth Mochi interface module 541, a seventh Mochi interface module 542, an eighth Mochi interface module 543, a second internal bus 544, a first data bus 545, a second data bus 546, and a second memory controller 560.

The main CPU 550 performs data processing. The processing is similar to the data processing performed by the MFP CPU 527. The main CPU 550 performs a process, for example, on data transferred from the I/O module chip 570. The process on data transferred from the I/O module chip 570 is hereinafter referred to as an I/O data process.

The main CPU 550 has a data processing speed higher than that of the MFP CPU 527. As the main CPU 550, for example, a CPU whose operating frequency is 1.6 GHz is used.

The main CPU 550 performs a decomposing process. The decomposing process refers to conversion of image data into image data in a sheet output format. Examples of image data in a sheet output format include bitmap data.

The main CPU 550 performs a UI rendering process. The UI rendering process refers to a process of displaying, on the display unit of the user interface 300, an image in accordance with an operation received by the operation receiving unit of the user interface 300.

In the present exemplary embodiment, the decomposing process and the UI rendering process are performed, not by the MFP CPU 527, but by the main CPU 550.

When the main CPU 550 according to the present exemplary embodiment, which is performing a process, such as an I/O data process, different from a decomposing process and a UI rendering process, receives a request to perform a decomposing process or a UI rendering process, the main CPU 550 performs the decomposing process or the UI rendering process with greater priority than the different process.

When the main CPU 550, which is performing an I/O data process, receives a request to perform a decomposing process or a UI rendering process, the main CPU 550 hands over the I/O data process, which is being performed, to the MFP CPU 527. More specifically, the main CPU 550 determines whether or not the I/O data process is to be handed over to the MFP CPU 527 on the basis of data subjected to the I/O data process. When the I/O data process is to be handed over to the MFP CPU 527, the main CPU 550 hands over the I/O data process to the MFP CPU 527, and causes the MFP CPU 527 to perform the remaining part of the I/O data process which has not been performed by the main CPU 550.

In execution of a decomposing process or a UI rendering process, the main CPU 550 notifies a direct memory access controller (DMAC) 572 (described below) of the I/O module chip 570 that the main CPU 550 is to perform the decomposing process or the UI rendering process. Upon completion of the decomposing process or the UI rendering process, the main CPU 550 notifies the DMAC 572 of completion of the process.

The main CPU 550 includes a first CPU core 551A, which controls the operations of the entire image forming apparatus 1, a second CPU core 551B, which controls the operations of the image reading apparatus 100, and a graphics processing unit (GPU) core 551C which processes an image. That is, the main CPU 550 has a multi-core configuration.

Each of the first CPU core 551A and the second CPU core 551B is an exemplary second controller. In a broad sense, the main CPU 550 is also an exemplary second controller.

In the present exemplary embodiment, the first CPU core 551A and the second CPU core 551B include primary cache memories 552A and 552B and a secondary cache memory 553A.

The GPU core 551C includes a primary cache memory 552C.

The sixth Mochi interface module 541, which serves as an exemplary second connecting unit, receives/transmits data from/to the fourth Mochi interface module 524 and the second memory controller 560.

The seventh Mochi interface module 542 receives data transferred from the second internal bus 544, and transfers the received data to the user interface 300. The data transferred from the seventh Mochi interface module 542 is displayed on the display unit of the user interface 300.

The eighth Mochi interface module 543 receives data transferred from the I/O module chip 570, and transfers the received data to the second internal bus 544 or the second memory controller 560.

The second internal bus 544, which serves as an exemplary first communication path, is used to receive/transmit packet data. The second internal bus 544 connects the main CPU 550, the sixth Mochi interface module 541, the seventh Mochi interface module 542, the eighth Mochi interface module 543, and the second memory controller 560 to each other.

The first data bus 545 is a communication path which connects the sixth Mochi interface module 541 to the second memory controller 560 directly.

The second data bus 546 is a communication path which connects the eighth Mochi interface module 543 to the second memory controller 560 directly.

The second memory controller 560, which serves as an exemplary storage controller, is a circuit for controlling, for example, storage of data in the DRAM 590, retrieval of data from the DRAM 590, and refresh of the DRAM 590. The second memory controller 560, which is connected to the second internal bus 544, the first data bus 545, and the second data bus 546, receives/transmits packet data from/to the other devices connected to the second internal bus 544, the first data bus 545, and the second data bus 546.

The I/O module chip 570 is used to receive data from an external device connected to the image forming apparatus 1.

The I/O module chip 570 includes an external-device interface unit 571, the DMAC 572, a ninth Mochi interface module 573, and a tenth Mochi interface module 574.

The external-device interface unit 571, which serves as an exemplary first connecting unit, is connected to external devices. Example of the external devices include communication targets, such as a terminal apparatus of a personal computer (PC) or the like, a USB memory, and a server apparatus. The external-device interface unit 571 obtains data from a connected external device.

The DMAC 572, which serves as an exemplary transmitting unit, transfers, to the DRAM 590, data which has been transferred from an external device to the external-device interface unit 571, and stores the transferred data in the DRAM 590. This transfer is direct memory access (DMA) transfer without control of the main CPU 550.

When the main CPU 550 is to perform a decomposing process or a UI rendering process, the DMAC 572 sets a flag. More specifically, when the DMAC 572 receives, from the main CPU 550, a notification that the main CPU 550 is to perform a decomposing process or a UI rendering process, the DMAC 572 sets on a flag register included in the DMAC 572. When the DMAC 572 receives, from the main CPU 550, a notification that the decomposing process or the UI rendering process is completed, the DMAC 572 sets the flag register off.

When the DMAC 572 stores, in the DRAM 590, data transferred from an external device to the external-device interface unit 571, the DMAC 572 transmits a request for an interrupt for the process performed on the data. The DMAC 572 refers to the flag register included in the DMAC 572. If the flag register is off, the DMAC 572 transmits an interrupt request to the main CPU 550. If the flag register is on, the DMAC 572 transmits an interrupt request to the MFP CPU 527.

The ninth Mochi interface module 573 receives data transferred from the external-device interface unit 571, and transfers the received data to the fifth Mochi interface module 525.

The tenth Mochi interface module 574 receives data transferred from the external-device interface unit 571, and transfers the received data to the eighth Mochi interface module 543.

The SSD 580 is, for example, a nonvolatile semiconductor memory. Instead of the SSD 580, for example, an embedded multimedia card (eMMC) may be used.

The DRAM 590, which serves as an exemplary storage unit, is, for example, a volatile semiconductor memory.

Description about a Handover Management Table

A handover management table will be described.

FIG. 5 is a diagram illustrating an exemplary configuration of a handover management table. The handover management table is a table for managing whether or not the main CPU 550 is to hand over an I/O data process to the MFP CPU 527. The handover management table is stored in the primary cache memory 552A of the main CPU 550.

In the handover management table illustrated in FIG. 5, "Request" describes the type of a process requested when the main CPU 550 is performing an I/O data process. "UI rendering" means a UI rendering process. "Decomposing" means a decomposing process. "Others" means a different process which corresponds neither a UI rendering process nor a decomposing process. "NOP" (No Operation) means that no operations are performed.

In the handover management table, "Header information" describes header information included in data subjected to the I/O data process. Each of "A", "B", and "C" illustrated in association with "UI rendering" and "Decomposing" means header information. "Other than A to C" illustrated in association with "UI rendering" and "Decomposing" means header information which corresponds to none of "A", "B", and "C".

Data including header information of any of "A", "B", and "C" has a higher priority in execution of the I/O data process than data including header information of "Other than A to C". More specifically, assume the case of multiple pieces of packet data which are continuous data subjected to an I/O data process. In this case, an I/O data process on data including any of "A", "B", and "C" requires real-time processing on multiple pieces of packet data compared with an I/O data process on data including "Other than A to C". Real-time processing has a property in which there is time limitation between execution of an I/O data process on one piece of packet data and execution of the I/O data process on a different piece of packet data subsequent to the one piece of packet data.

Each of "A", "B", and "C" indicates, for example, header information included in data subjected to a process which requires quality of service (QoS). "Other than A to C" indicates, for example, header information included in data subjected to a process which does not require QoS. QoS indicates quality of service provided over a network. Quality of service includes a quality about real-time processing.

"Handover" describes information about whether or not the main CPU 550 is to hand over the I/O data process to the MFP CPU 527. "Yes" means that the main CPU 550 is to hand over the I/O data process to the MFP CPU 527. "No" means that the main CPU 550 is not to hand over the I/O data process to the MFP CPU 527.

In the illustrated example, "A, B, and C" for "UI rendering" and "Decomposing" is associated with "Yes" in "Handover". In addition, "Other than A to C" for "UI rendering" and "Decomposing" is associated with "No" in "Handover". That is, in accordance with the priority in execution of an I/O data process, it is determined whether or not the main CPU 550 is to hand over the I/O data process to the MFP CPU 527. Regardless of "Header information", "Others" and "NOP" are associated with "No" in "Handover".

When the main CPU 550, which is performing an I/O data process, receives a request to perform a process different from the I/O data process, the main CPU 550 refers to the handover management table. On the basis of "Request" and "Header information", the main CPU 550 determines whether or not "Handover" is to be performed.

In the present exemplary embodiment, as described above, when the main CPU 550, which is performing an I/O data process, receives a request to perform a decomposing process or a UI rendering process, the main CPU 550 performs the decomposing process or the UI rendering process with greater priority than the I/O data process. In this case, the main CPU 550 hands over the I/O data process, which is to function as real-time processing, to the MFP CPU 527.

That is, in the present exemplary embodiment, when the main CPU 550 performs a second process with greater priority than a first process after start of the first process and before completion of the first process, the main CPU 550 determines whether or not the MFP CPU 527 is to be caused to restart the first process on the basis of a defined condition about data subjected to the first process. In particular, in the present exemplary embodiment, the defined condition about data subjected to the first process is a defined condition about priority in execution of the first process on the data. The priority is defined on the basis of time limitation between execution of the first process on a first part of data subjected to the first process and execution of the first process on a second part of data which is included in the data subjected to the first process and which is subsequent to the first part of data. The data subjected to the first process are multiple pieces of packet data.

Examples of the first process include an I/O data process. Example of the second process include a decomposing process and a UI rendering process.

When the main CPU 550, which is performing an I/O data process, receives a request to perform a process of "Others" or "NOP", regardless of the data subjected to the I/O data process, the main CPU 550 does not hand over the I/O data process. In this case, after completion of the process of "Others" or "NOP", the main CPU 550 restarts the I/O data process.

"Header information" illustrated in the handover management table in FIG. 5 is merely exemplary. "Header information" different from the "Header information" in FIG. 5 may be associated with "Request" and "Handover".

The primary cache memory 552A may be interpreted as a holding unit which holds, in association with each other, determination information about determination as to whether or not the MFP CPU 527 is to restart an I/O data process and content information about data content. Examples of the determination information include information illustrated in "Handover" of the handover management table. Examples of the content information include information illustrated in "Header information" of the handover management table.

Figure 6:
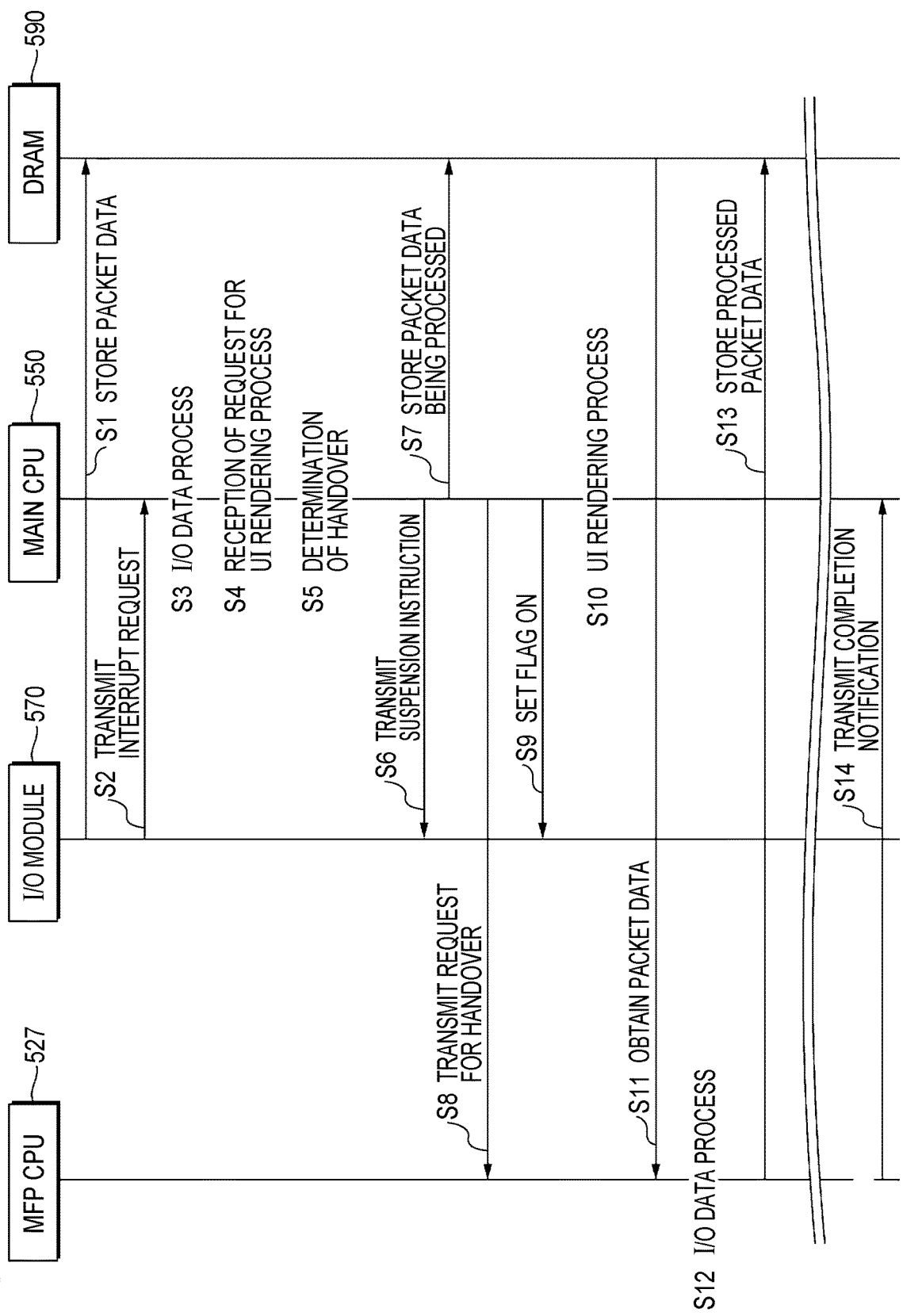
FIG. 6 is a diagram for describing operations performed in the case where a main central processing unit (CPU), which is performing an I/O data process, receives a request to perform a UI rendering process.

Operations Performed when a Request for a UI Rendering Process is Received During Execution of an I/O Data Process FIG. 6 is a diagram for describing operations performed when the main CPU 550, which is performing an I/O data process, receives a request to perform a UI rendering process. In the description below, assume that the header information included in the data subjected to the I/O data process which is being performed by the main CPU 550 is "A" (see FIG. 5).

First, the external-device interface unit 571 of the I/O module chip 570 is connected to an external device, and data is transferred from the external device to the external-device interface unit 571. The DMAC 572 of the I/O module chip 570 stores, in the DRAM 590, the data transferred to the external-device interface unit 571 (step 1). The data is transferred to the second memory controller 560 through the tenth Mochi interface module 574, the eighth Mochi interface module 543, and the second internal bus 544. The transferred data is stored in the DRAM 590 by the second memory controller 560. The data transferred from the external device is image data consisting of multiple pieces of packet data. That is, in the present exemplary embodiment, image data is transferred from the external device on each piece of packet data.

The DMAC 572 transmits, to the main CPU 550, an interrupt request for the process performed on the packet data stored in the DRAM 590. That is, the DMAC 572 transmits, to the main CPU 550, transmits an interrupt request for an I/O data process (step 2).

When the main CPU 550 receives the interrupt request for an I/O data process, the main CPU 550 retrieves the packet data that is to be subjected to the I/O data process and that is stored in the DRAM 590. The main CPU 550 performs the process on the retrieved packet data, that is, the I/O data process (step 3). The packet data that is to be subjected to the I/O data process is image data transferred from the external device, that is, the first packet data among the multiple pieces of packet data.

After that, the main CPU 550 retrieves pieces of packet data sequentially from the remaining packet data which has not been subjected to the I/O data process, and performs the I/O data process on the retrieved packet data.

The main CPU 550 receives a request to perform a UI rendering process (step 4).

The main CPU 550 refers to the handover management table (see FIG. 5), and determines whether or not a handover to the MFP CPU 527 is to be performed on the basis of the priority in execution of the I/O data process on the packet data subjected to the I/O data process. In this example, "Request" for the process received while the main CPU 550 performs the I/O data process is "UI rendering" (see FIG. 5), and the packet data subjected to the I/O data process includes "A" as described above. Thus, the main CPU 550 determines that the I/O data process is to be handed over to the MFP CPU 527 (step 5).

The main CPU 550 instructs the DMAC 572 to suspend the interrupt request (step 6).

Steps 1 to 6 are performed regardless of whether or not the main CPU 550 is to hand over the I/O data process to the MFP CPU 527. If the main CPU 550 is not to hand over the I/O data process to the MFP CPU 527, upon completion of the process in step 5, the main CPU 550 suspends the I/O data process, and performs the UI rendering process. Upon completion of the UI rendering process, the main CPU 550 restarts the suspended I/O data process.

If the main CPU 550 is to hand over the I/O data process to the MFP CPU 527, upon completion of the process in step 5, the main CPU 550 stores, in the DRAM 590, the packet data that is being subjected to the I/O data process (step 7). That is, the main CPU 550 returns back, to the DRAM 590, the packet data having been retrieved from the DRAM 590 for execution of the I/O data process. The packet data is transferred to the second memory controller 560 through the second internal bus 544. The transferred packet data is stored in the DRAM 590 by the second memory controller 560.

The main CPU 550 transmits, to the MFP CPU 527, a request for a handover of the I/O data process (step 8). In the handover request, the main CPU 550 transmits, to the MFP CPU 527, address information of the DRAM 590 which corresponds to the packet data having been subjected to the I/O data process.

The main CPU 550 notifies the DMAC 572 that the UI rendering process is to be performed, and causes the DMAC 572 to set a flag on (step 9). That is, the main CPU 550 notifies the DMAC 572 that the UI rendering process is to be performed, and causes the flag register, which is included in the DMAC 572, to be set on.

The main CPU 550 performs the UI rendering process (step 10).

When the flag register is on, a new external device may be connected to the external-device interface unit 571, and data may be transferred from the connected external device. In this case, the DMAC 572 transfers data, which is transferred from the newly-connected external device to the external-device interface unit 571, to the second memory controller 560 through the tenth Mochi interface module 574, the eighth Mochi interface module 543, and the second data bus 546. That is, the transferred data does not pass through the second internal bus 544. The transferred data is stored in the DRAM 590 by the second memory controller 560. Alternatively, the DMAC 572 may transfer the data, which is transferred from the newly-connected external device to the external-device interface unit 571, to the second memory controller 560 through the ninth Mochi interface module 573, the fifth Mochi interface module 525, the first internal bus 526, the fourth Mochi interface module 524, the sixth Mochi interface module 541, and the first data bus 545. Also in this case, the transferred data is stored in the DRAM 590 by the second memory controller 560.

The DMAC 572 transmits, to the MFP CPU 527, an interrupt request for the process performed on the data transferred from the newly-connected external device on the basis of the flag register which is on.

Upon reception of the request for a handover of the I/O data process from the main CPU 550, the MFP CPU 527 obtains packet data stored in the DRAM 590 (step 11). The packet data is among the multiple pieces of packet data subjected to the I/O data process, and has not been subjected to the I/O data process. That is, in the request for a handover of the I/O data process, the MFP CPU 527 obtains, from the main CPU 550, address information indicating an area of the DRAM 590 in which packet data having been subjected to the I/O data process is stored. The MFP CPU 527 obtains, from the DRAM 590, packet data which has not been subjected to the I/O data process and which is subsequent to the packet data having been subjected to the I/O data process. When the packet data is retrieved from the DRAM 590 by the second memory controller 560, the packet data is transferred to the MFP CPU 527 through the first data bus 545, the sixth Mochi interface module 541, the fourth Mochi interface module 524, and the first internal bus 526. That is, the packet data transferred from the DRAM 590 to the MFP CPU 527 does not pass through the second internal bus 544.

The MFP CPU 527 performs the I/O data process on the obtained packet data (step 12). That is, the MFP CPU 527 restarts the I/O data process which is being performed by the main CPU 550.

The MFP CPU 527 stores, in the DRAM 590, packet data having been subjected to the I/O data process (step 13). The packet data is transferred to the second memory controller 560 through the first internal bus 526, the fourth Mochi interface module 524, the sixth Mochi interface module 541, and the first data bus 545. The transferred packet data is stored in the DRAM 590 by the second memory controller 560.

After that, the processes in steps 11 to 13 are performed sequentially on the remaining packet data which has not been subjected to the I/O data process.

When the MFP CPU 527 performs the I/O data process on all of the packet data which has not been subjected to the I/O data process, the MFP CPU 527 transmits, to the main CPU 550, a completion notification indicating that the I/O data process is completed (step 14).

In the example in FIG. 6, the operations performed when the main CPU 550, which is performing an I/O data process, receives a request to perform a UI rendering process are described. Even in the case where the process requested when the main CPU 550 is performing an I/O data process is a decomposing process, processes similar to those described above are performed.

As described above, in the present exemplary embodiment, the main CPU 550 obtains header information related to the data subjected to the I/O data process, and determines whether or not the MFP CPU 527 is to restart the I/O data process, from the "Handover" information held, in association with the obtained header information, in the handover management table in the primary cache memory 552A.

In the present exemplary embodiment, the main CPU 550 obtains data, which is stored in the DRAM 590, through the second internal bus 544, and performs a UI rendering process or a decomposing process on the obtained data. While the main CPU 550 performs a UI rendering process or a decomposing process, the communication path, through which data transmitted from the DMAC 572 to the second memory controller 560 passes, and the communication path, through which data transmitted from the DRAM 590 to the MFP CPU 527 passes, are made different from a communication path including the second internal bus 544.

In the present exemplary embodiment, in the case where a device is connected to the external-device interface unit 571, when the main CPU 550 is performing a UI rendering process or a decomposing process, the DMAC 572 transmits, to the MFP CPU 527, a request to perform a process on data transmitted from the device.

In the present exemplary embodiment, when the main CPU 550 causes the MFP CPU 527 to restart the I/O data process, the main CPU 550 transmits, to the MFP CPU 527, information about data having been subjected to the I/O data process.

Pullback Process

The flow of a pullback process will be described. The pullback process is a process in which, when the main CPU 550 has handed over an I/O data process to the MFP CPU 527, the main CPU 550 performs the I/O data process again. The pullback process is performed, for example, when the main CPU 550 hands over the I/O data process to the MFP CPU 527 and the main CPU 550 starts a decomposing process or a UI rendering process.

Figure 7:
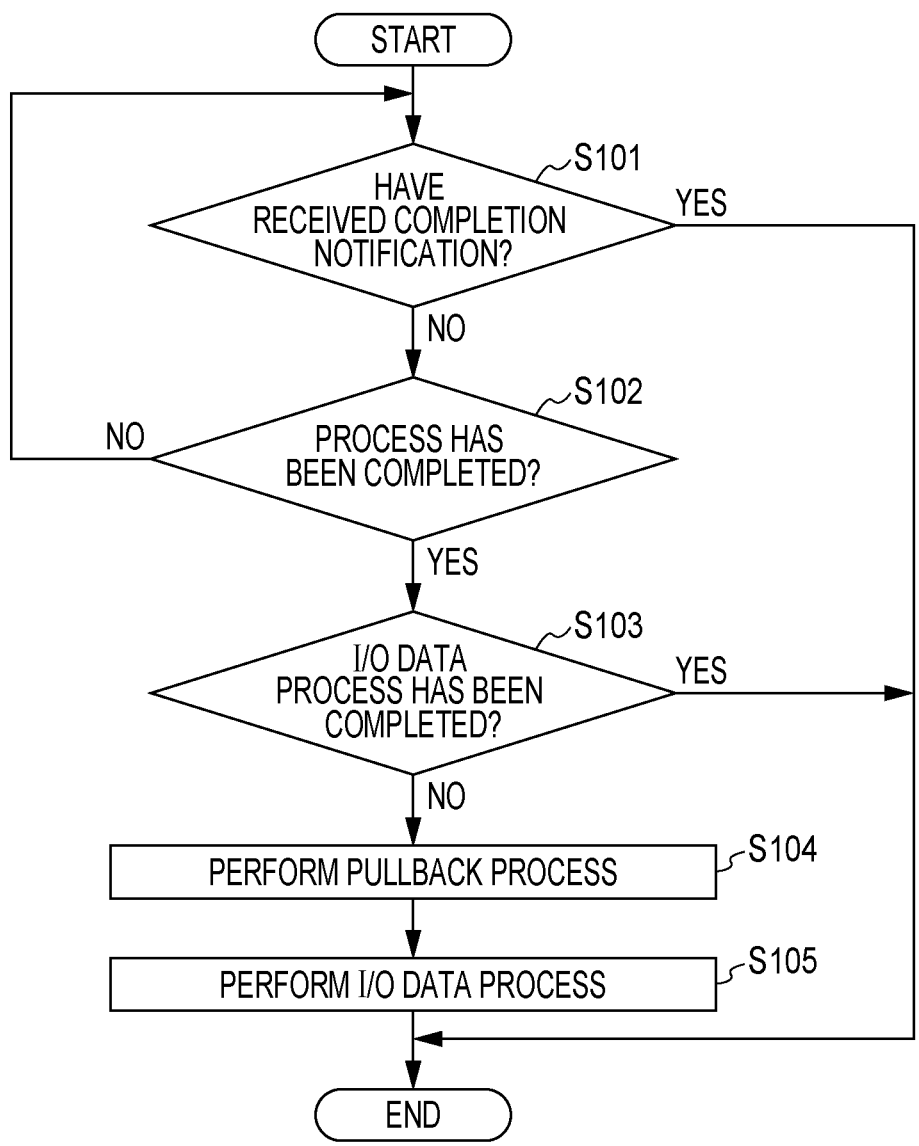
FIG. 7 is a flowchart of a pullback process.

FIG. 7 is a flowchart of the pullback process.

The main CPU 550 determines whether or not a completion notification, indicating that the I/O data process has been completed, has been obtained from the MFP CPU 527 (S101). If the completion notification has been obtained (YES in S101), the pullback process ends.

If the main CPU 550 has not obtained the completion notification (NO in S101), the main CPU 550 determines whether or not the process, such as a UI rendering process or a decomposing process, which is performed with greater priority than the I/O data process, has been completed (S102). If the negative result is obtained (NO in S102), the process in step 101 is performed again.

If the process performed with greater priority than the I/O data process has been completed (YES in S102), the main CPU 550 determines whether or not the MFP CPU 527 has completed the I/O data process (S103). More specifically, the main CPU 550 checks the communication state of the MFP CPU 527. Thus, the main CPU 550 determines whether or not the MFP CPU 527 has completed the I/O data process.

If the MFP CPU 527 has completed the I/O data process (YES in S103), the pullback process ends.

If the MFP CPU 527 has not completed (NO in S103), the main CPU 550 transmits a pullback notification to the MFP CPU 527 (S104). The pullback notification is a notification that the responsibility for the I/O data process is to be returned back from the MFP CPU 527 to the main CPU 550.

On reception of the pullback notification, the MFP CPU 527 instructs the DMAC 572 to discontinue the interrupt request. The MFP CPU 527 stores, in the DRAM 590, the packet data which is being subjected to the I/O data process. The MFP CPU 527 transmits, to the main CPU 550, address information of the DRAM 590 corresponding to the packet data having been subjected to the I/O data process.

The main CPU 550 obtains, from the DRAM 590, the packet data which has not been subjected to the I/O data process, and performs the I/O data process on the obtained packet data (S105).

As described above, in the exemplary embodiment, in the case where the MFP CPU 527 is caused to restart the I/O data process, even when a UI rendering process or a decomposing process has been completed and the I/O data process has not been completed, the main CPU 550 takes over the I/O data process which has been performed by the MFP CPU 527, and restarts the I/O data process.

The exemplary embodiment of the present disclosure is described above. The technical scope of the present disclosure is not limited to the scope described in the exemplary embodiment described above. It is clear, from the description of the scope of claims, that embodiments obtained by making various changes or improvements on the exemplary embodiment described above are also encompassed in the technical scope of the present disclosure.

For example, the image forming apparatus 1 (see FIG. 1) described in the present exemplary embodiment has the image reading apparatus 100 and the image recording apparatus 200 (including the control device 500) which are integrated into one unit. Alternatively, the image reading apparatus 100 and the image recording apparatus 200 (see FIG. 1) may be housed in the respective independent cases.

The image forming apparatus 1 according to the present exemplary embodiment is assumed to have an apparatus configuration used in an office or the like. Alternatively, an image forming apparatus for commercial use (production use) may be used.

The present exemplary embodiment employs the configuration in which the Mochi unit 510 includes the MFP module chip 520, the main CPU module chip 540, and the I/O module chip 570. Further, the Mochi unit 510 may include a different integrated circuit.

The present exemplary embodiment describes two cases of the hierarchical structure of a cache memory in the main CPU 550: a single-level hierarchy (the GPU core 551C) and a two-level hierarchy (the first CPU core 551A and the second CPU core 551B). In either case, the hierarchical structure of a cache memory is not limited to the illustrated cases. For example, the hierarchical structure of a cache memory may have three levels or more.

The present exemplary embodiment describes the configuration having semiconductor chips including no functional blocks in which the individual functional modules do not operate, that is, the configuration having Mochis obtained by selectively combining only functional blocks necessary for the operations. A semiconductor chip having a different configuration may be used. For example, a semiconductor chip, in which a set of functional blocks necessary for the operations of the system are disposed on a single semiconductor substrate, may be used.

The connection between functional modules may be performed by using a connection method other than a Mochi interface module.

In the present exemplary embodiment, the common communication path serving as a data communication path in the MFP module chip 520 is only the first internal bus 526. Alternatively, as a common communication path, a communication path may be provided in addition to the first internal bus 526. The common communication path serving as a data communication path in the main CPU module chip 540 is only the second internal bus 544. Alternatively, as a common communication path, a different communication path may be provided in addition to the second internal bus 544.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a storage that stores data;
    a first integrated circuit that includes a first controller configured to:
        process data obtained from a device;
        control operations of the device;
        obtain first data subjected to a first process and stored in the storage, the first data being a plurality of pieces of packet data; and
        perform the first process on the first data;
    a second integrated circuit that includes:
        a storage controller that controls storage of transmitted data in the storage, the transmitted data being transmitted from a transmitter;
        a first communication path connected to the storage controller;
        a second controller whose data processing speed is faster than a data processing speed of the first controller, the second controller being connected to the storage controller via the first communication path and configured to:
            obtain, through the first communication path, second data stored in the storage;
            perform a second process on the second data, with greater priority than the first process; and
            when performing the second process, after start of the first process and before completion of the first process, determine whether or not the first controller is to restart the first process based on a condition defined as to the first data;
        a second communication path used when the second controller is performing the second process, in which data is transmitted from the transmitter to the storage controller; and
        a third communication path used when the second controller is performing the second process, in which data is transmitted from the storage to the first controller; and a third integrated circuit that includes:
a first connector configured to connect to the device; and
the transmitter configured to:
transmit to the second integrated circuit, the first data on each piece of packet data; and
when the first connector is connected to the device, while the second controller is performing the second process, transmit, to the first controller, a request to process data transmitted from the device.

2. The information processing apparatus according to claim 1,
wherein the condition is defined as to a degree of priority in execution of the first process on the first data.

3. The information processing apparatus according to claim 2,
wherein the degree of priority is defined based on time limitation between execution of the first process on a first part of the first data and execution of the first process on a second part of the data, the second part of the data being included in the first data and being subsequent to the first part of the first data.

4. The information processing apparatus according to claim 1, further comprising:
a holder configured to hold determination information and content information in association with each other, the determination information being information about the restart determination, the content information being information about data content,
wherein the second controller is configured to obtain the content information for the first data, and determine whether or not the first controller is to restart the first process from the determination information which is held in the holder in association with the obtained content information.

5. The information processing apparatus according to claim 1,
wherein the second integrated circuit further includes a second connector configured to connect to the first integrated circuit, and
when the first controller is to restart the first process, the second controller is configured to transmit, to the first controller, information about the first data.

6. The information processing apparatus according to claim 1,
wherein, when the first controller has restarted the first process, if the second process has been completed and the first process has not been completed, the second controller is configured to take over the first process having been performed by the first controller, and restart the first process.

7. A semiconductor device comprising:
a first integrated circuit that includes a first controller configured to:
process data obtained from a device;
control operations of the device;
obtain first data subjected to a first process, the first data being a plurality of pieces of packet data; and
perform the first process on the first data;
a second integrated circuit that includes:
a storage controller that controls storage of transmitted data, the transmitted data being transmitted from a transmitter;
a first communication path connected to the storage controller;
a second controller whose data processing speed is faster than a data processing speed of the first controller, the second controller being connected to the storage controller via the first communication path and configured to:
obtain second data through the first communication path;
perform a second process on the second data, with greater priority than the first process; and
when performing the second process, after start of the first process and before completion of the first process, determine whether or not the first controller is to restart the first process based on a condition defined as to the first data;
a second communication path used when the second controller is performing the second process, in which data is transmitted from the transmitter to the storage controller; and
a third communication path used when the second controller is performing the second process, in which data is transmitted to the first controller; and
a third integrated circuit that includes:
a first connector configured to connect to the device; and
the transmitter configured to:
transmit to the second integrated circuit, the first data on each piece of packet data; and
when the first connector is connected to the device, while the second controller is performing the second process, transmit, to the first controller, a request to process data transmitted from the device.

8. The semiconductor device according to claim 7,
wherein the condition is defined as to a degree of priority in execution of the first process on the first data.

9. The semiconductor device according to claim 8,
wherein the degree of priority is defined based on time limitation between execution of the first process on a first part of the first data and execution of the first process on a second part of the data, the second part of the data being included in the first data and being subsequent to the first part of the data.

10. An information processing apparatus comprising:
means for storing data;
means for including a first controller configured to:
process data obtained from a device;
control operations of the device;
obtain first data subjected to a first process and stored in the means for storing data, the first data being a plurality of pieces of packet data; and
perform the first process on the first data;
means for including a storage controller that controls storage of transmitted data in the means for storing data, the transmitted data being transmitted from a means for transmitting;
first means for communication connected to the storage controller;
means for including a second controller whose data processing speed is faster than a data processing speed of the first controller, the second controller being connected to the storage controller via the first means for communication and configured to:
obtain, through the first means for communication, second data stored in the means for storing data;
perform a second process on the second data, with greater priority than the first process; and when performing the second process, after start of the first process and before completion of the first process, determine whether or not the first controller is to restart the first process based on a condition defined as to the first data;

second means for communication used when the second controller is performing the second process, in which data is transmitted from the means for transmitting to the storage controller;

third means for communication used when the second controller is performing the second process, in which data is transmitted from the means for storing data to the first controller:

means for connecting to the device; and the means for transmitting configured to:
 transmit the first data on each piece of packet data; and
 when the means for connecting to the device is connected to the device, while the second controller is performing the second process, transmit, to the first controller, a request to process data transmitted from the device.

* * * * *